United States Patent
Jain et al.

(10) Patent No.: US 7,460,544 B2
(45) Date of Patent: Dec. 2, 2008

(54) FLEXIBLE MESH STRUCTURE FOR HIERARCHICAL SCHEDULING

(75) Inventors: Sanjeev Jain, Shrewsbury, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 775 days.

(21) Appl. No.: 11/024,957

(22) Filed: Dec. 29, 2004

(65) Prior Publication Data

US 2006/0140192 A1 Jun. 29, 2006

(51) Int. Cl.
*H04L 12/28* (2006.01)
(52) U.S. Cl. .............. 370/395.4; 370/229; 370/230; 370/395.41; 370/415; 370/461
(58) Field of Classification Search ............ 370/60, 370/229, 230, 235, 389, 392, 395.4, 395.41, 370/395.42, 401, 412, 413, 415, 419, 423, 370/461
See application file for complete search history.

(56) References Cited

U.S. PATENT DOCUMENTS

| | | | | |
|---|---|---|---|---|
| 5,126,999 A | * | 6/1992 | Munter et al. | 370/415 |
| 5,917,821 A | * | 6/1999 | Gobuyan et al. | 370/392 |
| 6,104,700 A | * | 8/2000 | Haddock et al. | 370/235 |
| 6,449,283 B1 | * | 9/2002 | Chao et al. | 370/461 |
| 6,850,490 B1 | * | 2/2005 | Woo et al. | 370/230 |
| 6,891,834 B1 | * | 5/2005 | Dally et al. | 370/395.4 |
| 7,002,916 B2 | * | 2/2006 | Parruck et al. | 370/235 |
| 7,349,332 B1 | * | 3/2008 | Srinivasan et al. | 370/229 |
| 2002/0023168 A1 | * | 2/2002 | Bass et al. | 709/232 |
| 2002/0141427 A1 | * | 10/2002 | McAlphine | 370/413 |
| 2003/0223420 A1 | * | 12/2003 | Ferolito | 370/389 |
| 2006/0029079 A1 | * | 2/2006 | Cohen et al. | 370/395.4 |

* cited by examiner

*Primary Examiner*—Edan Orgad
*Assistant Examiner*—Andrew C Lee
(74) *Attorney, Agent, or Firm*—Daly, Crowley, Mofford & Durkee, LLP (57) ABSTRACT

Systems and methods employing a flexible mesh structure for hierarchical scheduling are disclosed. The method generally includes reading a packet grouping configured in a two dimensional mesh structure of N columns, each containing M packets, selecting and promoting a column best packet from each column to a final row containing N packets, reading, selecting and promoting a final best packet from the final row to a next level in the hierarchy. Each time a final best packet is selected and promoted, the mesh structure can be refreshed by replacing the packet corresponding to the final best packet, and reading, selecting and promoting a column best packet from the column containing the replacement packet to the final row. As only the column containing the replacement packet and the final row are read and compared for each refresh, the mesh structure results in reduced read and compare cycles for schedule determination.

19 Claims, 7 Drawing Sheets

FLEXIBLE MESH STRUCTURE FOR HIERARCHICAL SCHEDULING

BACKGROUND

Advances in computing and networking technology have led to the development of new and increasingly complex communications networks. In network communications systems, data is typically transmitted in packages called packets or frames, which may be routed over a variety of intermediate network nodes before reaching their destination. These intermediate nodes (e.g., controllers, base stations, routers, switches, and the like) are often complex computer systems in their own right, and may include a variety of specialized hardware and software components.

Often, multiple network elements will share a single resource. For example, multiple servers may attempt to send data over a single channel. In such situations, resource allocation, coordination, and management are important to ensure the smooth, efficient, and reliable operation of the system, and to protect against sabotage by malicious users.

In the transmission of data over communications networks, network elements typically receive and buffer data packets prior to retransmitting them to their appropriate destinations over data links. For example, each network element may allocate network resources to schedule the retransmission of the data packets. The scheduling may be used in systems to provide differentiated services such as different levels of Quality of Service (QoS). For example, certain important or time critical communications, such as voice or video communications, may be intolerant to delays or are otherwise time critical whereas other less important or less time critical types of communications, such as batch file transfers and emails, may be more tolerant of communication delays. In addition, certain network users may desire (and pay for) higher levels of network availability.

As computer networks evolve and as network traffic increases, providing more bandwidth, lower latency, decreased costs and increased flexibility is becoming increasingly important. Maintaining efficient flow of information over data communication networks is thus becoming increasingly important.

Scheduling algorithms are often employed to ensure that higher priority packets reach their destinations faster than lower priority packets. In particular, scheduling algorithms such as weighted fair queuing (WFQ), also referred to as packetized general processor sharing (PGPS), are often used to select the best packet from among groups of packets in queues contending for bandwidth to facilitate fair bandwidth sharing. Hierarchical scheduling is one method to schedule packets so that the link capacity of the intermediate hops within the hierarchy is not exceeded. At each level of the hierarchy, a selection of the best packet to move forward is made based on a selection criterion such as departure time and/or other numeric metric.

BRIEF DESCRIPTION OF THE DRAWINGS

Reference will be made to the following drawings, in which.

DESCRIPTION OF SPECIFIC EMBODIMENTS

Systems and methods employing a flexible mesh structure for hierarchical scheduling are disclosed. The method generally includes reading a packet grouping configured in a two dimensional mesh structure of N columns, each containing M packets, selecting and promoting a column best packet from each column to a final row containing N packets, reading, selecting and promoting a final best packet from the final row to a next level in the hierarchy. Each time a final best packet is selected and promoted, the mesh structure can be refreshed by replacing the packet corresponding to the final best packet, and reading, selecting and promoting a column best packet from the column containing the replacement packet to the final row. As only the column containing the replacement packet and the final row are read and compared for each refresh, the mesh structure results in reduced read and compare cycles for schedule determination.

It should be appreciated that these systems and methods can be implemented in numerous ways, several examples of which are described below. The following description is presented to enable any person skilled in the art to make and use the inventive body of work. The general principles defined herein may be applied to other embodiments and applications. Descriptions of specific embodiments and applications are thus provided only as examples, and various modifications will be readily apparent to those skilled in the art. Accordingly, the following description is to be accorded the widest scope, encompassing numerous alternatives, modifications, and equivalents. For purposes of clarity, technical material that is known in the art has not been described in detail so as not to unnecessarily obscure the inventive body of work.

Figure 1:
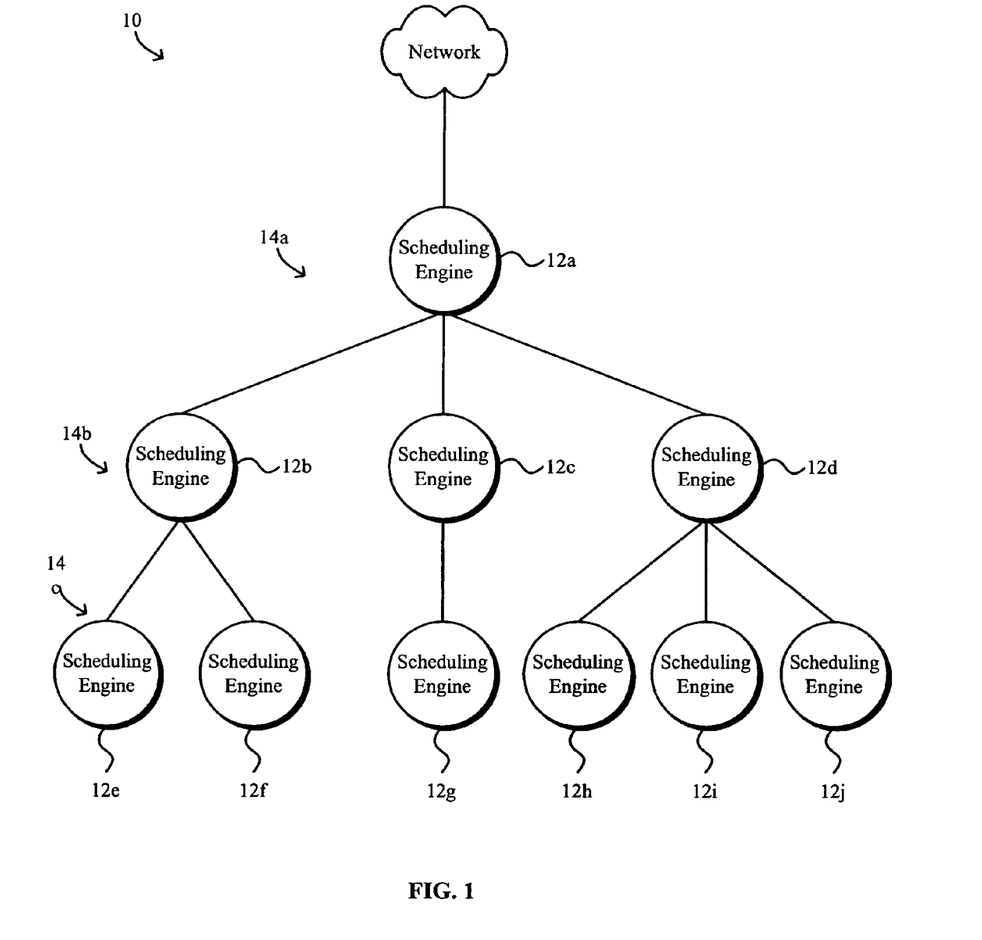
FIG. 1 is a block diagram of an exemplary hierarchical scheduler implemented by a number of scheduling engines hierarchically arranged in multiple hierarchical levels.

In the transmission of data over communications networks, scheduling algorithms such as weighted fair queuing (WFQ) are often used to select a best packet from among groups of packet queues contending for bandwidth. Hierarchical scheduling is one method to schedule packets so that the link capacity of intermediate hops within the hierarchy is not exceeded. FIG. 1 is a block diagram of an exemplary hierarchical scheduler 10 implemented by a number of scheduling engines 12*a*-12*j* hierarchically arranged in three hierarchical levels 14*a*, 14*b*, 14*c*. At each level of the hierarchy, a selection of the best packet to move forward is made based on a selection criterion, e.g., departure time and/or other numeric metric. Once a selection of the best packet is made using the scheduling algorithm, the selected best packet is moved forward in the hierarchy.

Figure 2:
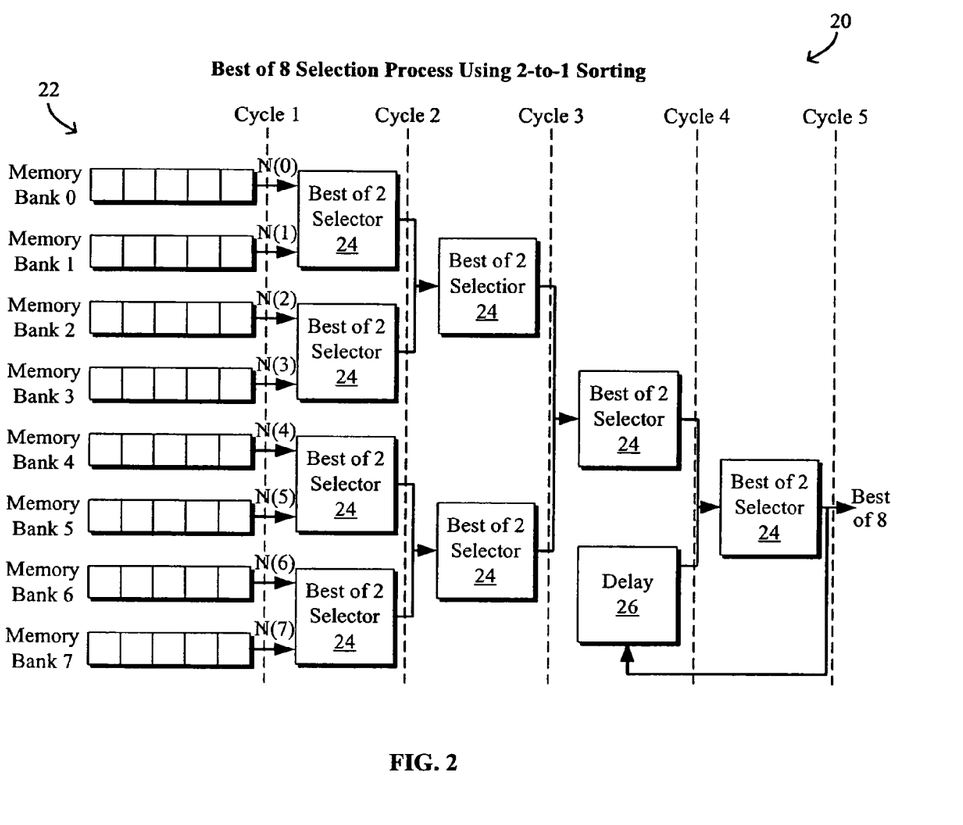
FIG. 2 is a block diagram illustrating a conventional best of 8 selection process for a scheduler.

FIG. 2 is a block diagram illustrating a conventional scheduling engine 20 that selects the best packet in a group by performing a pipelined sort operation at selection time. In particular, the exemplary conventional scheduling engine 20 implements a best of 8 selection process. As shown, each of the 8 memory banks 22 may store a packet queue. In cycle 1, a packet from each of the 8 memory banks is compared with another packet from a different memory bank using a best of 2 selector 24 such that 4 packets remain after cycle 1. In cycle 2, each of the 4 packets output from the best of 2 selectors in cycle 1 are compared with another of the 4 packets such that 2 packets remain after cycle 2. After approximately 5 cycles, the best of 8 packet is selected. A delay element 26 receives the best of 8 packet from the previous iteration as feedback when the scheduling engine is pipelined. In other words, the result from each previous best-of-8 selection can be compared with the next best-of-8 selection iteration to determine the best entry from an 8N grouping.

The pipelined sorting method of the conventional scheduling engine 20 may work well for a small number of entries in the group. However, as the number of entries in the selection group is increased, the pipelined sorting method implemented by the scheduling engine 20 requires an increasing number of cycles and thus becomes impractical and difficult to implement for high scheduling rates or high packet rates. As is shown in FIG. 2, sorting among eight packets takes approximately 5 cycles. When the group is expanded to 32 packets, the pipelined sorting method of FIG. 2 requires an additional 4 cycles or a total of 9 cycles as 4 sets of 8 packets are pipelined. Similarly, sorting among a group of 64 packets requires approximately 13 cycles and sorting among 1024 packets requires approximately 133 cycles. As is evident, the number of cycles to sort a large number of packets becomes unacceptably high for very high speed scheduling process.

To improve the efficiency of the hierarchical best packet selection process, a two dimensional flexible mesh structure may be employed. The two dimensional flexible mesh structure may generally contain N columns and a final row having N entries or elements. Each column may contain M entries or packets and a column best packet is selected from each column using an M-to-1 sorter or selector and promoted to a corresponding entry in the final row. A final N-to-1 sorter selects a final best packet from the final row to be promoted or advanced to the next level in the hierarchy. The best packet selection process may be achieved by sorting the items based on the selection criteria prior to a request for selecting a best packet is made. In other words, the competing entries can be sorted so that the selection process is already performed when a replacement is made. Each time a final best packet is selected and promoted, the mesh structure can be refreshed by replacing the packet corresponding to the final best packet, and reading, selecting and promoting a column best packet from the column containing the replacement packet to the final row. As only the column containing the replacement packet and the final row are read and compared for each refresh, the mesh structure results in reduced read and compare cycles for schedule determination.

Figure 3:
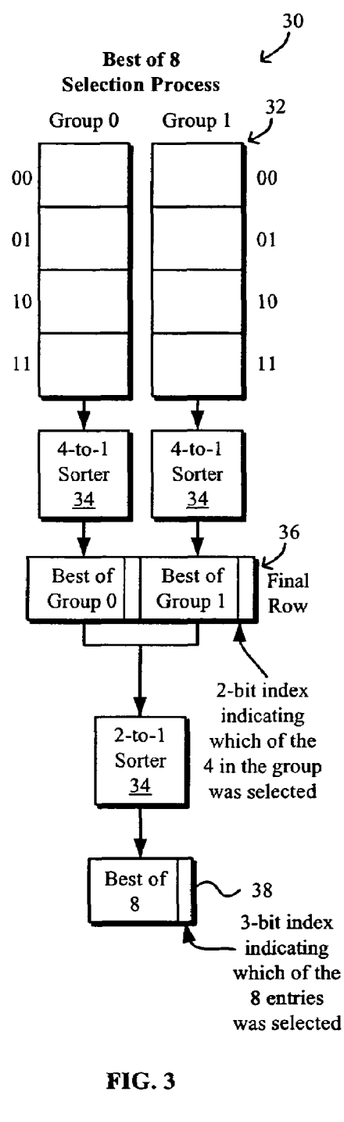
FIG. 3 is a schematic illustrating an exemplary two-dimensional flexible mesh structure for hierarchical scheduling for a grouping of 8 entries.

FIG. 3 is a schematic illustrating an exemplary two dimensional flexible mesh structure 30 for hierarchical scheduling for a grouping of 8 entries, i.e., a best of 8 selection process. As shown, the 8 entries are arranged in a mesh structure that includes two columns or groups 32 (N=2), each group being a 4-entry column (M=4), and a final row 36 having N, e.g., 2, entries. 4-to-1 sorters 34 are employed to select the best entry in each group to form the final row 36 and a 2-to-1 sorter 34 is employed to select the best entry from the final row 36 as the final best of 8 entry 38. A selection value for each entry of the scheduling hierarchy 30 can be stored in the memory structures.

For groupings of a limited size, e.g., up to 8 entries, a wide parallel access memory structure can be used so that the entire group can be read in a single cycle. In the best of 8 selection process, only one read cycle is needed. Larger groupings may require multiple read cycles. After the entries are read, a comparison of the entries is made using 4-to-1 sorters 34. Each 4-to-1 sorter 34 outputs the best entry selected from the corresponding column 32 to a corresponding location in the final row 36. The final row 36 thus contains as many elements as columns in the mesh structure. In addition, each entry in the final row 36 includes an index indicating which entry in the corresponding group is represented in the final row 36. As each group contains 4 entries, a 2-bit index is used by each of the 2 entries in the final row. From the final row, the 2-to-1 sorter 34 determines and selects the best entry from the final row 36 and promotes the selected entry as the final best of 8 entry 38. The final best entry 38 includes an index to indicate which entry in the grouping of 8 entries is represented by the final best entry. With a grouping of 8 entries, a 3-bit index is used in the final best of 8 entry 38 to indicate both the group (e.g., 0 or 1) and the entry within the group (e.g., 00, 01, 10, or 11).

Each sorter 34 can be formed by a tree of comparators and multiplexers. The sorter 34 or selection circuitry can be pipelined so that only one additional cycle is needed for each additional 8 entries in a group. With pipelined selection circuitry, the result for each memory read of 8 entries can be compared with the selected value from the previous read to determine the selected entry from an 8N grouping.

Figure 4:
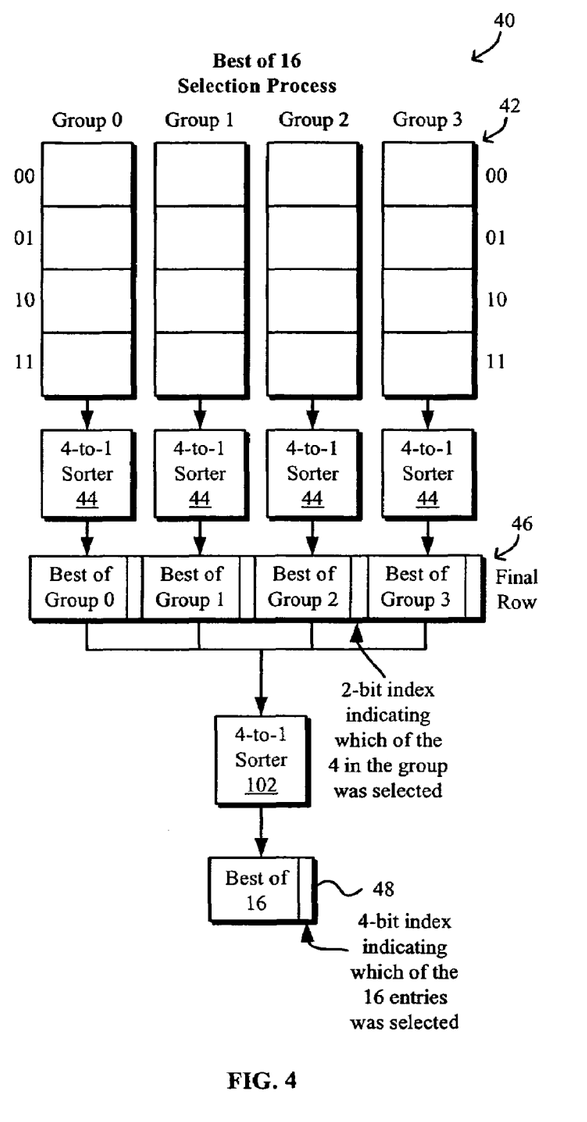
FIG. 4 is a schematic illustrating an exemplary two-dimensional flexible mesh structure for hierarchical scheduling for a grouping of 16 entries.

The exemplary flexible mesh structure and selection process for hierarchical scheduling illustrated in FIG. 3 for a grouping of 8 entries can be easily expanded to a grouping of 16 entries. FIG. 4 is a schematic illustrating an exemplary flexible mesh structure 40 for hierarchical scheduling for a grouping of 16 entries. As shown, the 16 entries are arranged in a mesh structure that includes four groups 42, each group being a 4-entry column, and a final row 46. 4-to-1 sorters 44 are employed to select the best entry in each group to form the final row 46 and another 4-to-1 sorter 44 is employed to select the best entry from the final row 46 as the final best of 16 entry 48. 2 read cycles are needed to read a grouping of 16 entries when using an 8 wide parallel access memory structure. Each entry in the final row includes a 2-bit index indicating which entry in the corresponding group is represented in the final row 46. Similarly, the final best of 16 entry 48 includes a 4-bit index to indicate which entry in the grouping of 16 entries is represented by the final best entry 48. In particular, the 4-bit index includes 2 bits to indicate which group and 2 bits to indicate which entry within the group that the final best entry 48 represents.

Figure 5:
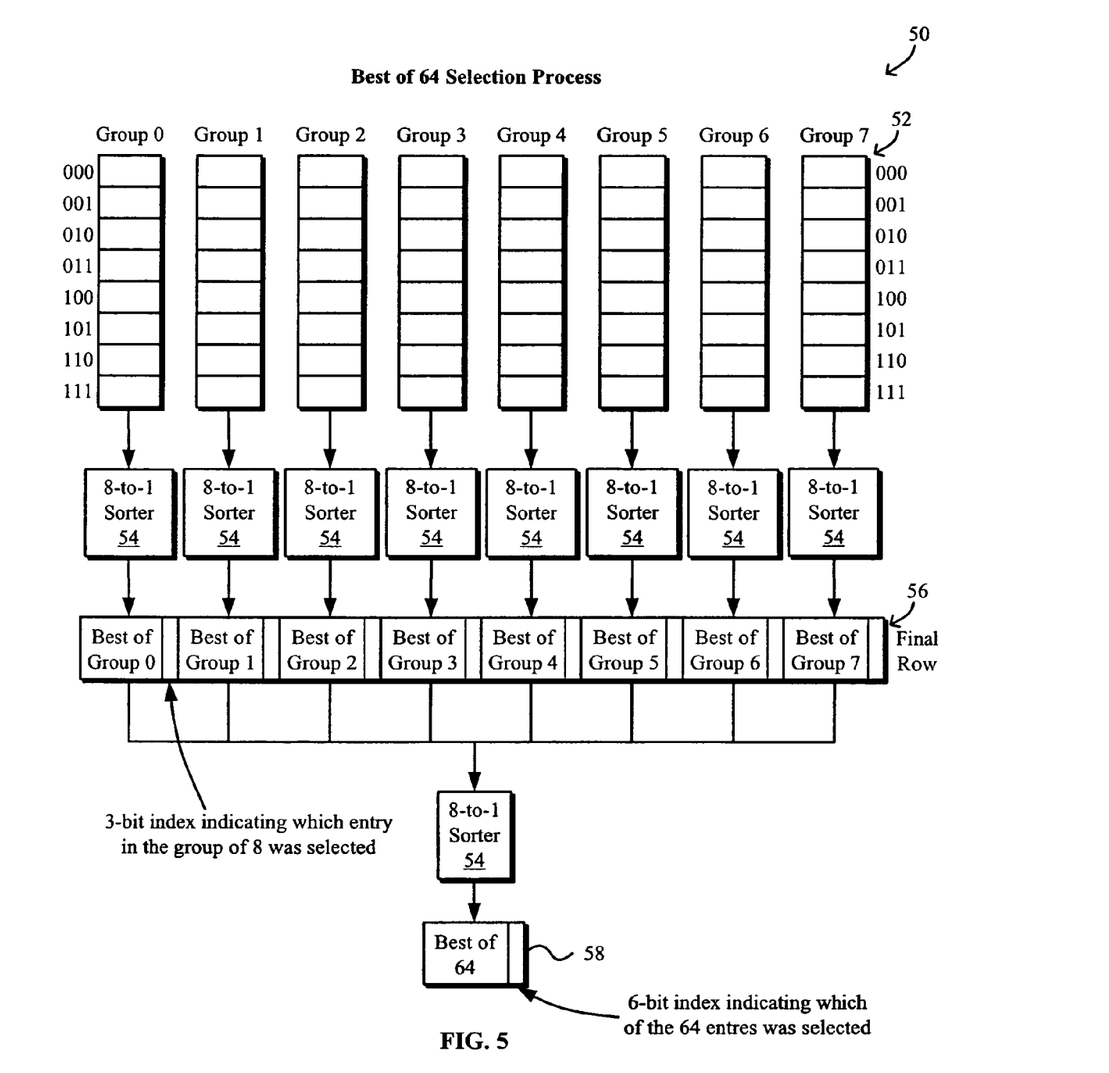
FIG. 5 is a schematic illustrating an exemplary two-dimensional flexible mesh structure for hierarchical scheduling for a grouping of 32 entries.
Figure 6:
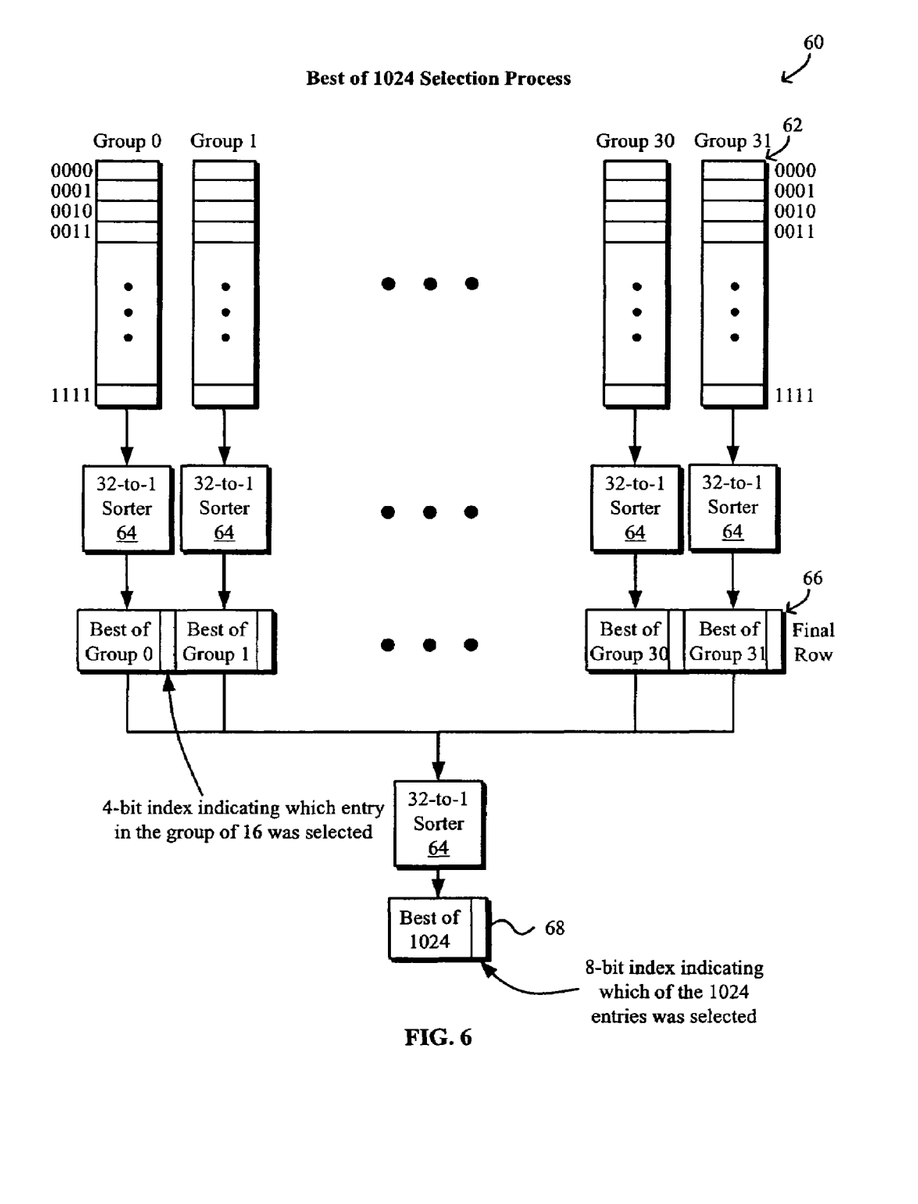
FIG. 6 is a schematic illustrating an exemplary two-dimensional flexible mesh structure for hierarchical scheduling for a grouping of 1024 entries.

FIGS. 5 and 6 illustrate exemplary flexible mesh structures for hierarchical scheduling for grouping of 64 and 1024 entries, respectively. In the grouping of 64 entries 50 as shown in FIG. 5, the 64 entries are arranged in a mesh structure that includes eight groups 52, each group being a 8-entry column, and a final row 56. 8-to-1 sorters 54 are employed to select the best entry in each group to form the final row 56 and another 8-to-1 sorter 54 is employed to select the best entry from the final row 56 as the final best of 64 entry 58. 8 read cycles are needed to read a grouping of 64 entries when using an 8 wide parallel access memory structure. Each entry in the final row includes a 3-bit index indicating which entry in the corresponding group is represented in the final row 56. Similarly, the final best of 64 entry 58 includes a 6-bit index to indicate which entry in the grouping of 64 entries is represented by the final best entry 58. In particular, the 6-bit index includes 3 bits to indicate which group and 3 bits to indicate which entry within the group that the final best entry 58 represents.

Similarly, in the grouping of 1024 entries 60 as shown in FIG. 6, the 1024 entries are arranged in a mesh structure that includes 32 groups 62, each group being a 32-entry column, and a final row 66. 32-to-1 sorters 64 are employed to select the best entry in each group to form the final row 66 and another 32-to-1 sorter 64 is employed to select the best entry from the final row 66 as the final best of 1024 entry 68. The 32 entries in a column can be read in 4 cycles when using an 8 wide parallel access memory structure as the 32 entries in each column are typically scattered among 8 memory banks. Each entry in the final row 66 includes a 4-bit index indicating which entry in the corresponding group is represented in the final row 66. The 32 entries in the final row 66 can similarly be scattered among 8 memory banks and thus can be read in 4 cycles. The final best of 1024 entry 68 also includes an 8-bit index to indicate which entry in the grouping of 1024 entries is represented by the final best entry 68. In particular, the 8-bit index includes 4 bits to indicate which group and 4 bits to indicate which entry within the group that the final best entry 68 represents.

Regardless of the size of the grouping, once a selection of the best packet from the grouping is made and the selected best packet is advanced in the hierarchy, a resulting hole, as indicated by the index for the final best entry, is created in its place within the grouping. The hole within the grouping can be filled by the scheduled elements further back within the hierarchy. As noted above, each time a final best packet is selected and promoted, the hole in the mesh structure can be replaced and thus the mesh structure refreshed by replacing the packet corresponding to the final best packet, and reading, selecting and promoting a column best packet from the column containing the replacement packet to the final row. As only the column containing the replacement packet and the final row are read and compared for each refresh, the mesh structure results in reduced read and compare cycles for schedule determination.

Figure 7:
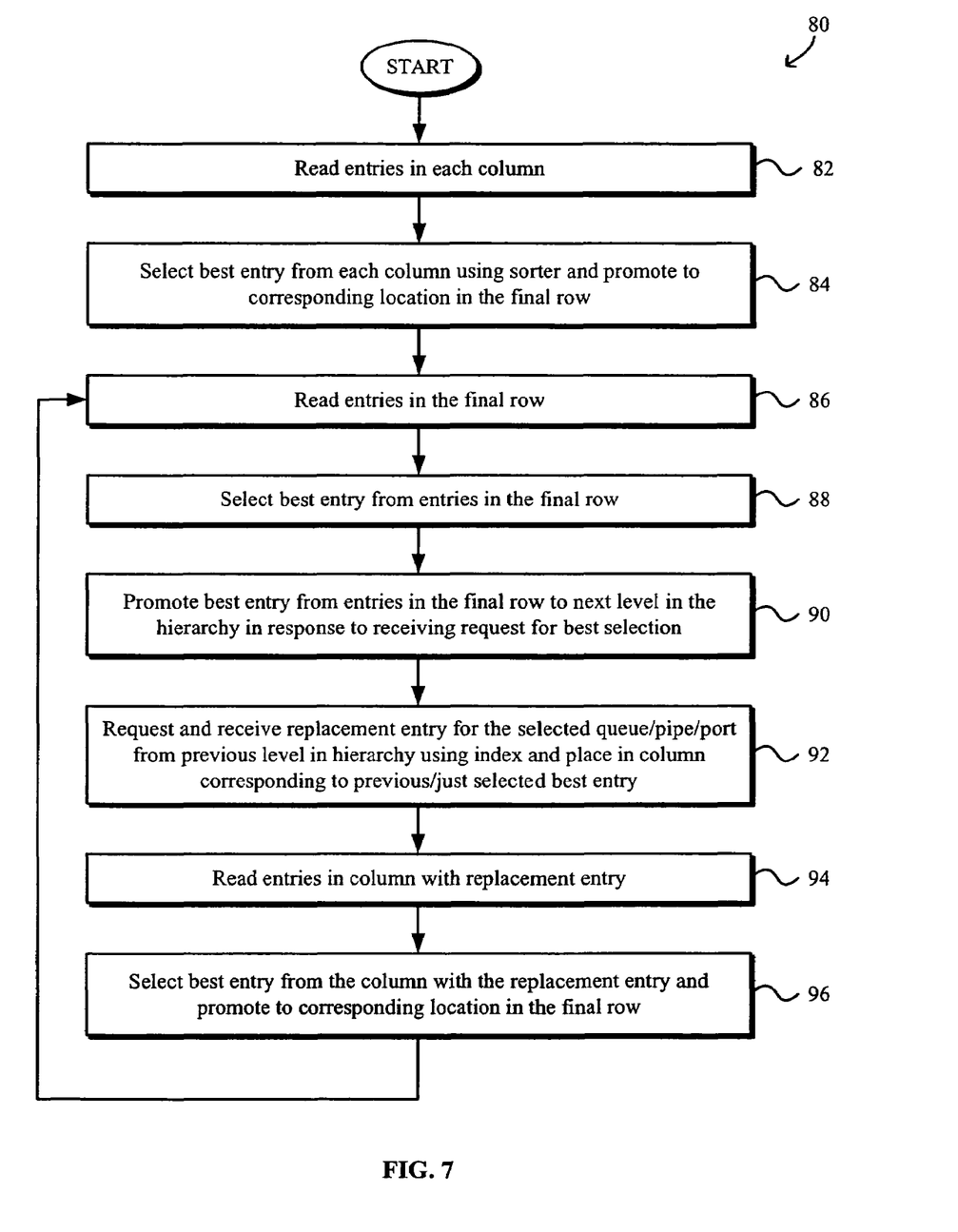
FIG. 7 is a flowchart illustrating an exemplary process for hierarchical scheduling for a grouping of entries using a flexible two-dimensional mesh structure.

FIG. 7 is a flowchart illustrating an exemplary process 80 of hierarchical scheduling for a grouping of entries using a flexible two dimensional mesh structure. At block 82, the entries in each column are read. The number of cycles for the read may depend on the total number of entries in the grouping and the memory structure. A wide parallel access memory structure, e.g., 8 wide, can be used so that several entries can be read in a single cycle. Merely as an example, for a grouping of 1024 entries arranged in 32 columns each with 32 entries and an 8 wide parallel access memory structure, the entries in each column can be read in 4 cycles.

At block 84, a best entry from each column is selected using selection circuitry or a sorter and the best entry in each column is promoted to the corresponding location in the final row. Each entry in the final row includes an index to indicate the entry in the corresponding column to which the selected best entry corresponds. It is noted that the selection circuitry can be pipelined so that as the selection circuitry selects the best entry for one column, the next column can be read during the same cycle. The pipelined configuration thus requires only one additional cycle for each additional 8 entries in the grouping.

The entries in the final row are read at block 86 and a final best entry is selected from the entries in the final row at block 88. The final best entry may include an index to indicate which column and which entry within the column the final best entry corresponds. Upon receiving a request for a best selection, the final best entry from the final row is promoted to the next level in the hierarchy at block 90.

The scheduling process 80 illustrated in FIG. 7 is merely one exemplary implementation and various modifications may be made in implementing the two dimensional mesh structure and scheduling scheme. For example, the final row may be read and compared when a request for the final best entry arrives instead of having the final best entry already determined when the request arrives. As another example, the replacement column may be read and compared and the column best entry may be promoted to the final row when a request for the final best entry arrives rather than having the best column entry already determined when the request arrives. As is evident, various other modifications may be made to the scheduling process 80.

When the final best entry is promoted to the next level in the hierarchy, a resulting hole, as indicated by the index for the final best entry, is created in its place within the grouping. The hole within the grouping can be filled by the scheduled elements further back within the hierarchy. In particular, at block 92, a replacement entry is requested and received for the selected queue/pipe/port from the previous level in the hierarchy and placed in the column location corresponding to the previous/just selected final best entry using the index in the final best entry. At block 94, the entries in the previously selected column in which the replacement entry is place are read. At block 96, a best entry from the column containing the replacement entry is selected using the sorter and promoted to the corresponding entry or location in the final row. The process 80 then returns to block 86 where the entries in the final row are read.

As is evident, with the use of the flexible mesh structure in the hierarchical scheduling process, each time a best entry is selected and promoted from the grouping and a replacement entry is placed in the resulting hole in the grouping, only the entries in the corresponding column is read, compared, and promoted to the final row. In other words, the other unaffected columns need not be read or compared as the other entries in the final row corresponding to those other columns need not be modified. Thus, for example, in a grouping of 1024 entries with 32 columns each with 32 entries, when a replacement entry arrives, only the column corresponding to the replacement entry is read in 4 cycles (32 entries scattered among 8 memory banks) and the best result is determined in an additional approximately 4 or 5 cycles (4 cycles to read the final row of 32 entries). Thus in approximately 8 or 9 cycles, the mesh structure of 1024 entries can be refreshed with the newly received entry. In contrast, the configuration and selection process for a conventional scheduling engine may require 128 cycles to be read even when the 1024 entries are scattered among 8 memory banks.

As another example, in a grouping of 256 entries with 16 columns each with 16 entries, when a replacement entry arrives, only the column corresponding to the replacement entry is read in 2 cycles (16 entries scattered among 8 memory banks) and the best result is determined in an additional approximately 2 or 3 cycles (2 cycles to read the final row of 16 entries). Thus in approximately 4 or 5 cycles, the mesh structure of 256 entries can be refreshed with the newly received entry. As is evident, the mesh structure is flexible and easily scalable. If the grouping of entries is maintained in external memory, the performance of the mesh architecture is advantageous for even a grouping of as few as 8 entries by configuring the 8 entries into two 4-entry columns and a 2-entry final row (as shown in and described above with reference to FIG. 3).

The two-dimensional mesh or grid structure of groupings for hierarchical scheduling results in reduced read and compare cycles for schedule determination. The selection process for determining the best packet or entry to advance to the next level in the hierarchy is thus performed efficiently and, as is evident, the number of packets or entries grouped at any level of the hierarchy is not limited. For large groupings, the improvement in scheduling efficiency can be great.

Figure 8:
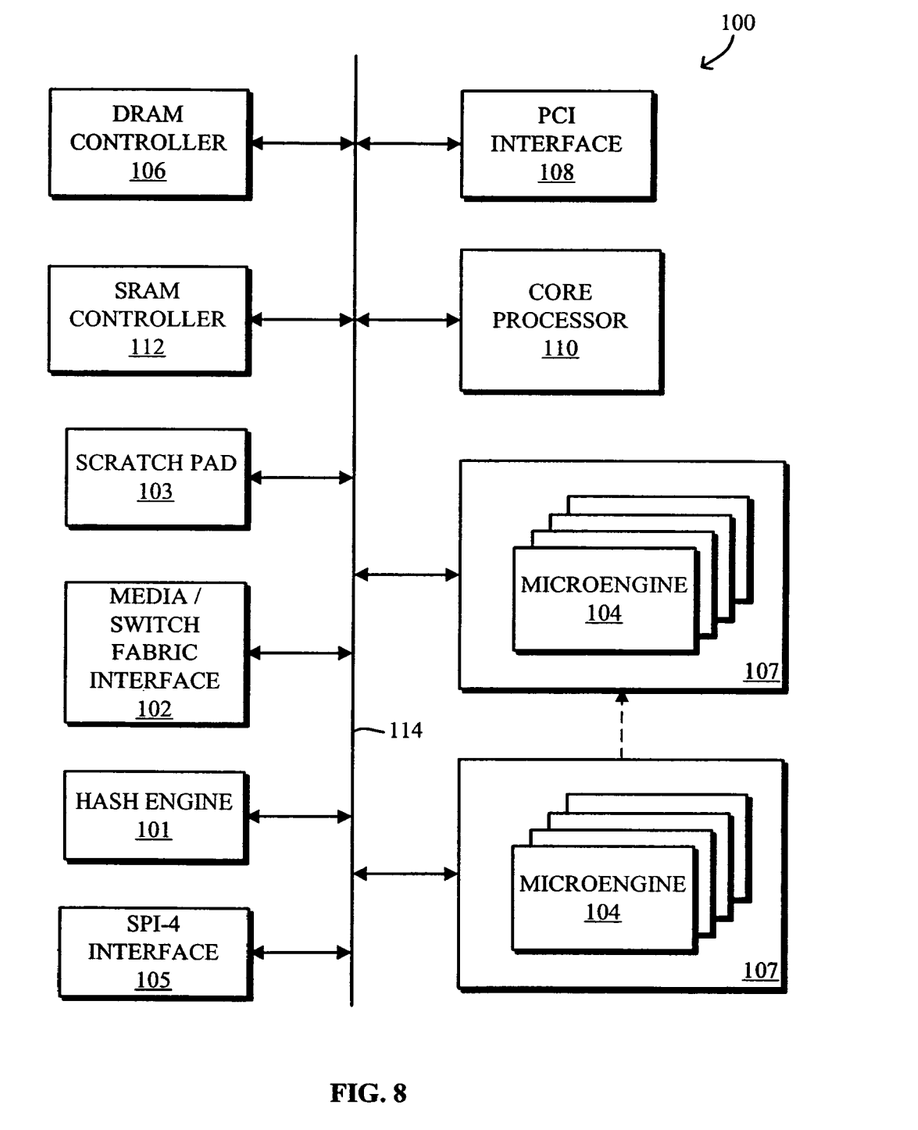
FIG. 8 is a block diagram of an exemplary network processor in which the systems and method for hierarchical scheduling using two-dimensional mesh structures may be implemented.

The systems and methods of hierarchical scheduling using flexible mesh structures described herein can be used in a variety of network processors. Network processors are used to perform packet processing and other networking operations and may implement the hierarchical scheduling systems and methods using a mesh structure as described herein. An example of a network processor 100 is shown in the block diagram of FIG. 8. The network processor 100 has a collection of processing engines 104, arranged in clusters 107. Processing engines 104 may, for example, comprise multi-threaded, Reduced Instruction Set Computing (RISC) processors tailored for packet processing. As shown in FIG. 8, network processor 100 may also include a core processor 110 (e.g., an Intel XScale® processor) that may be programmed to perform control plane tasks involved in network operations, such as signaling stacks and communicating with other processors. The core processor 110 may also handle some data plane tasks, and may provide additional packet processing threads.

The network processor 100 may also feature a variety of interfaces that carry packets between network processor 100 and other network components. For example, network processor 100 may include a switch fabric interface 102 (e.g., a Common Switch Interface (CSIX)) for transmitting packets to other processor(s) or circuitry connected to the fabric; a media interface 105 (e.g., a System Packet Interface Level 4 (SPI-4) interface) that enables network processor 100 to communicate with physical layer and/or link layer devices; an interface 108 for communicating with a host (e.g., a Peripheral Component Interconnect (PCI) bus interface); and/or the like.

The network processor 100 may also include other components shared by the engines 104 and/or core processor 110, such as one or more static random access memory (SRAM) controllers 112, dynamic random access memory (DRAM) controllers 106, a hash engine 101, and a relatively low-latency, on-chip scratch pad memory 103 for storing frequently used data. One or more internal buses 114 are used to facilitate communication between the various components of the system.

It will be appreciated that FIG. 8 is provided for purposes of illustration, and not limitation, and that the systems and methods described herein can be practiced with devices and architectures that lack some of the components and features shown in FIG. 8 and/or that have other components or features that are not shown.

While FIG. 8 illustrate a network processor, it will be appreciated that the systems and methods described herein can be implemented using other hardware, firmware, and/or software. In addition, the techniques described herein may be applied in a wide variety of network devices (e.g., routers, switches, bridges, hubs, traffic generators, and/or the like).

Thus, while several embodiments are described and illustrated herein, it will be appreciated that they are merely illustrative. Other embodiments are within the scope of the following claims.

What is claimed is:

1. A method of scheduling data packet transmission in a data communication network for a grouping of packets, comprising:
    reading the grouping of packets, the packets being configured in a two dimensional mesh structure of N columns, each column containing M packets, each of N and M being greater than 1;
    selecting a column best packet from the packets in each column;
    promoting the best column packet from each column into a corresponding entry in a final row containing N packets;
    reading the final row;
    selecting a final best packet from the final row;
    promoting the final best packet from the grouping of packets;
    replacing the promoted final best packet in the grouping with a replacement packet within the grouping;
    reading the column containing the replacement packet;
    selecting a column best packet from the packets in the column containing the replacement packet;
    promoting the best column packet from the column containing the replacement packet into a corresponding location in the final row; and
    repeating the reading the final row and selecting the final best packet from the final row.

2. The method of claim 1, in which at least one of the grouping of packets and the final row is stored in at least one parallel access memory structure.

3. The method of claim 2, in which the parallel access memory structure is an 8 wide parallel access memory structure.

4. The method of claim 1, in which the selecting the column best packet is pipelined with the reading the grouping of packets.

5. The method of claim 1, in which each entry in the final row includes the selected column best packet and an index indicating to which entry within the corresponding column the selected column best packet corresponds.

6. The method of claim 1, in which the final best packet is associated with an index indicating to which packet within the grouping of packets the final best packet corresponds.

7. The method of claim 1, in which the grouping of packets is within an hierarchy, the promoting the final best packet is to a next level in the hierarchy.

8. A scheduling engine for scheduling packet transmission in a network communications device, comprising:
    a two dimensional memory mesh structure for storing a grouping of packets, the two dimensional memory mesh structure containing N columns, each column containing M packets, each of N and M being greater than 1;
    N sorters, each sorter configured to select a column best packet from the packets in each column;
    a memory structure containing a final row for storing N packets output from the N sorters;
    a final best packet sorter configured to select a final best packet from the N packets in the final row and to promote the final best packet from the grouping of packets; and
    wherein the scheduling engine in which the two dimensional memory mesh structure is further configured to replace the promoted final best packet within the grouping packets upon the final best packet sorter selecting and promoting the final best packet from the grouping of packets, and wherein the two dimensional memory mesh structure is further configured to repeat the reading of the final row and to select the final best packet from the final row.

9. The scheduling engine of claim 8, in which at least one of the two dimensional memory mesh structure and the memory structure containing the final row includes at least one parallel access memory structure.

10. The scheduling engine of claim 9, in which the parallel access memory structure is an 8 wide parallel access memory structure.

11. The scheduling engine of claim 8, in which each entry in the final row includes the selected column best packet and an index indicating to which entry within the corresponding column the selected column best packet corresponds.

12. The scheduling engine of claim 8, in which the final best packet is associated with an index indicating to which packet within the grouping of packets the final best packet corresponds.

13. The scheduling engine of claim 8, in which the grouping of packets is within an hierarchy, the promoting the final best packet is to a next level in the hierarchy.

14. A system comprising:
a network interface to facilitate communication with a network; and
a network processor interfacing the network interface, the network processor including at least one scheduling engine for scheduling packet transmission, each scheduling engine including:
a two dimensional memory mesh structure for storing a grouping of packets, the two dimensional memory mesh structure containing N columns, each column containing M packets, each of N and M being greater than 1;
N sorters, each sorter configured to select a column best packet from the packets in each column;
a memory structure containing a final row for storing N packets output from the N sorters; and
a final best packet sorter configured to select a final best packet from the N packets in the final row and to promote the final best packet from the grouping of packets,
wherein the two dimensional memory mesh structure is further configured to replace the promoted final best packet within the grouping packets upon the final best packet sorter selecting and promoting the final best packet from the grouping of packets,
wherein the two dimensional memory mesh structure is further configured to repeat the reading of the final row and to select the final best packet from the final row.

15. The system of claim 14, in which at least one of the two dimensional memory mesh structure and the memory structure containing the final row includes at least one parallel access memory structure.

16. The system of claim 15, in which the parallel access memory structure is an 8 wide parallel access memory structure.

17. The system of claim 14, in which each entry in the final row includes the selected column best packet and an index indicating to which entry within the corresponding column the selected column best packet corresponds.

18. The system of claim 14, in which the final best packet is associated with an index indicating to which packet within the grouping of packets the final best packet corresponds.

19. The system of claim 14, in which the grouping of packets is within an hierarchy, the promoting the final best packet is to a next level in the hierarchy.

* * * * *

UNITED STATES PATENT AND TRADEMARK OFFICE
CERTIFICATE OF CORRECTION

PATENT NO. : 7,460,544 B2  Page 1 of 1
APPLICATION NO. : 11/024957
DATED : December 2, 2008
INVENTOR(S) : Jain et al.

It is certified that error appears in the above-identified patent and that said Letters Patent is hereby corrected as shown below:

On the Title page, in field (56), under "U.S. Patent Documents", in column 2, line 8, delete "McAlphine" and insert -- McAlpine --, therefor.

Drawings
On Sheet 2 of 7, in FIG. 2 (Below Cycle 3), line 2, delete "Selectior" and insert -- Selector --, therefor.

On Sheet 4 of 7, in FIG. 5 (Below Reference Numeral 58), line 2, delete "entres" and insert -- entries --, therefor.

Signed and Sealed this

Twentieth Day of July, 2010

David J. Kappos
*Director of the United States Patent and Trademark Office*